Sept. 22, 1964    W. H. SCHUTMAAT    3,149,828
ADJUSTING DEVICE FOR PRESSURE REGULATOR VALVE
Filed Feb. 13, 1962
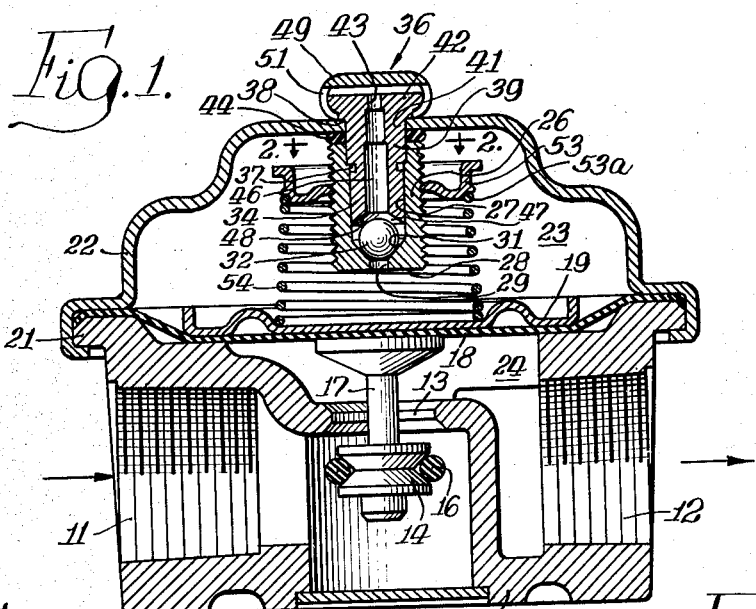
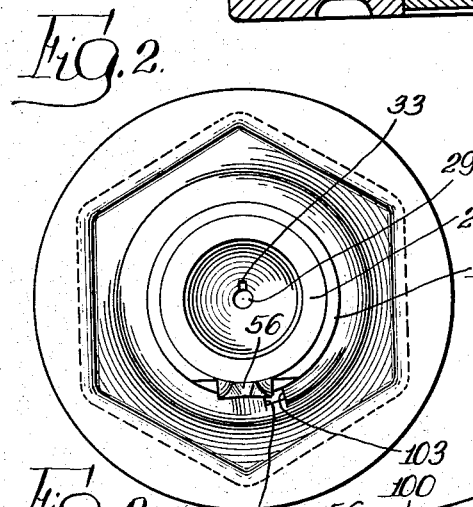
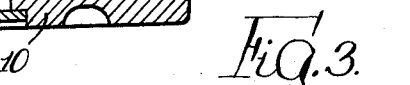
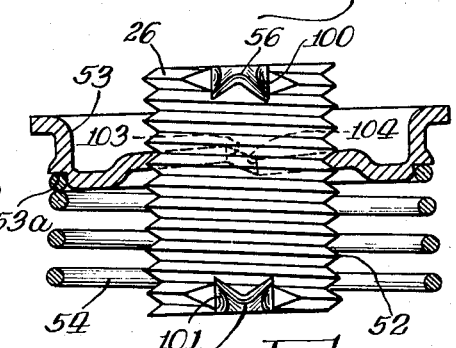
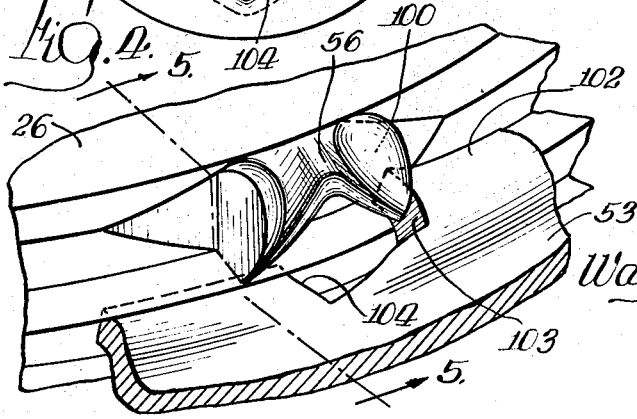
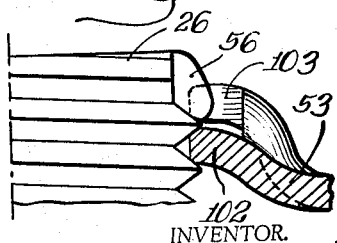
INVENTOR.
Wayne H. Schutmaat,
BY Hofgren, Brady,
Wegner, Allen & Stellman
Attys.

United States Patent Office 3,149,828
Patented Sept. 22, 1964

3,149,828
ADJUSTING DEVICE FOR PRESSURE
REGULATOR VALVE
Wayne H. Schutmaat, Needham, Mass., assignor to
Penn Controls, Inc., a corporation of Indiana
Filed Feb. 13, 1962, Ser. No. 173,010
9 Claims. (Cl. 267—1)

This invention relates generally to positional adjusting devices and in particular to an adjusting device for a diaphragm type pressure regulator valve.

This application is a continuation-in-part of application Serial No. 818,164 filed June 4, 1959, now Patent No. 3,062,525, granted Nov. 6, 1962, entitled "Adjusting Device for Pressure Regulator Valve."

Diaphragm type pressure regulating valves are conventionally used with, for example, various gas burning appliances. In this conventional type of valve the movement of the gas pressure responsive diaphragm is opposed by a compression-type coiled spring, a means for adjusting the spring, and hence the control point of the regulator, being accessible exteriorly of the valve housing. Similarly, valves of the type referred to are often provided with attachments for controlling the flow of air into and from the chamber above the diaphragm to thereby control the action of the valve member. Abbott Patent 2,302,284 discloses a regulating valve of the conventional type and having air flow control attachment incorporated therein.

The present invention is directed to an improved apparatus for providing the regulator spring adjustment and which may additionally provide a means for controlling the rate of pressure change in the upper diaphragm chamber of the regulating valve.

It is an object of the present invention, therefore, to provide an adjusting device for a pressure regulator valve which is accessible from the exterior of the valve housing and which prevents tampering with the regulator spring or adjusting it beyond safe limits.

It is a further object of the present invention to provide an adjusting device which can be conventionally inserted and sealed within an accommodating aperture in the cover component of a regulator valve housing, the sealing means also providing the desired frictional drag on the adjusting device.

It is a principal object of the present invention to provide abutments on the upper and lower threads of a tubular member forming part of the aforementioned adjusting device to limit the range of a retaining member for the regulator spring so as not to create a frictional connection between the adjusting device and the retaining member which cannot be overcome by the aforementioned frictional drag whenever a retaining member engages an interruption prior to having the adjusting device turned in the reverse direction.

Another object of the present invention is to provide a thread on the aforementioned retaining member which has thread end portions which are substantially perpendicular to the thread in order to contact the aforementioned abutments on the tubular member without creating a friction connection between the retaining member and the tubular member when the aforementioned frictional drag on the adjustment member is utilized to move the contacting end portion of the thread away from one of the abutments.

Further objects and advantages will become apparent from the following detailed description taken in connection with accompanying drawings.

In the drawings:

FIGURE 1 is a side sectional view of a regulating valve incorporating the adjusting device of the present invention;

FIGURE 2 is a sectional view taken generally along the line 2—2 of FIGURE 1 with a ball valve and an adjusting stud removed;

FIGURE 3 is an enlarged, detailed view of a portion of the apparatus of the present invention;

FIGURE 4 is an enlarged perspective view of portions of the adjusting stud and retaining member shown in FIGURES 2 and 3; and FIGURE 5 is an enlarged partial sectional side view of the adjusting stud and retaining member shown in FIGURE 4.

While this invention is susceptible of embodiments in many different forms, there is shown in the drawing and will herein be described in detail, an embodiment of the invention with the understanding that the present disclosure is to be considered as an exemplification of the principles of the invention and is not intended to limit the invention to the embodiment illustrated. The scope of the invention will be pointed out in the appended claims.

Referring initially to FIGURE 1, the adjusting device of the present invention is shown incorporated in a diaphragm type pressure regulating valve, the specific valve construction itself forming no part of the present invention. The valve structure includes a housing which is formed of a body casting 10 having an inlet passage 11 and an outlet passage 12 therein. The inlet and outlet passages communicate through an aperture 13 whose effective size is varied by the vertical positioning of a valve member 14. The valve member includes an O-ring 16 which may engage the margin of the aperture 13 to close the valve. The valve member 14 is supported on a stem 17 which, at its upper end, is rigidly attached to a flexible diaphragm 18. The upper face of the diaphragm carries an overlying rigid plate 19.

The body casting 10 is provided with a peripheral flange 21 over which is crimped the marginal edge of a generally cup-shaped cover member 22. The cover member thus overlies the upper face of the diaphragm to define a chamber 23 which is open to atmosphere by a means to be subsequently described. A chamber 24 underlying the diaphragm communicates with the outlet passage 12 of the valve. It may thus be seen that with upward movement of the diaphragm being resisted by a resilient means to be subseqeuntly described, the diaphragm will position the valve member 14 so as to maintain a constant pressure drop across the aperture 13 with the magnitude of the pressure drop being dependent upon the magnitude of the downward bias of the diaphragm 18. It will be understood that the valve construction could be such that the valve member 14 approaches the aperture 13 from its upper side. Under these conditions, the diaphragm would be provided with an upward bias by any suitable means such as a tension spring. The adjusting device of the present invention, now to be described, would function identically with either type of valve construction.

The apparatus of the present invention includes a tubular member 26 having a central bore 27 therein terminating at an end wall 28. The end wall is provided with an aperture 29 of reduced size and the area of junction of the aperture 29 and the bore 27 is defined by an inclined annular face 31 against which seats a sphere or ball 32 preferably formed of nylon. Complete closure of the aperture 29 by the ball 32 is prevented by the presence of a small notch 33 formed in the annular surface 31, the disposition of the notch being shown in FIGURE 2. The notch thus provides a by-pass around the ball 32.

The central bore in the tubular member 26 has inserted therein, by a press fit, a transversely fluted shank 34 of an adjusting stud generally indicated at 36. The stud and tubular member are provided with engaging shoulders 37 which defines the depth of insertion of the stud into the tubular member and a shoulder 38 which defines the depth of insertion of the stud into the cover member 22. The somewhat enlarged portion 39 extends freely through an aperture 41 in the cover member 22, the stud being further provided with an enlarged head 42 which overlies the portion of the cover member adjacent the aperture. The head 42 may be provided with a screwdriver slot 43. A sealing means, preferably in the form of an O-ring 44, is disposed between the under face of the cover member 22 and the upper end of the tubular member 26. It will be noted that the cooperating shoulders 37 and 38 are disposed so that they define a depth of insertion of the stud into the tubular member such that, when assembled, the O-ring is properly compressed to seal the entry of the stud into the aperture 41 and to apply a frictional force resisting rotation of the stud so as to permit its accurate adjustment and to prevent its being jarred out of adjustment. Upon rotation of the stud the complete assembly, including the tubular member 26 and the O-ring 44, is rotated with the stud with the frictional resisting force being generated at the engaging surfaces of the O-ring and the cover member.

The stud 36 has a central, axial bore 46, the lower end of which is provided with an inclined annular surface 47 which is interrupted by a notch 48 therein, similar to the notch 33 in member 26. The upper end of the bore 46 extends through the stud and opens into the notch 43 in the stud head. A snap-on cap 49 is positioned over the stud head and is provided with a plurality of legs 51 which grip the stud head and permit communication of the bore 46 with atmosphere. The ball 32 is adapted to seat against the annular surface 47 under certain conditions of operation, the notch 48 providing a by-pass around the ball.

The outer surface of the tubular member is threaded as indicated at 52 in FIGURE 3, and accommodates a spring retaining member 53. Bottomed on the retaining member is a compression spring 54 having a somewhat frusto-conical configuration, the lower end of the spring bearing against the upper face of the plate 19. The surface 53a of the spring retainer, against which the upper coil of the spring 54 bears, has a hexagonal configuration so that the spring retainer member and the spring are rotationally locked together. The frictional force exerted by the spring 54 is such that the spring and consequently the spring retainer 53 are held against rotation as the stud 36 and consequently the tubular member 26 are rotated. It may thus be seen that by rotating the stud the spring retaining member 53 will be positioned axially along the tubular member with this axial positioning of the spring retaining member defining the downward bias exerted by the spring 54 upon the diaphragm.

Referring now to FIGURES 3, 4 and 5, the uppermost and the lowermost effective turns of the thread on the tubular member 26 has been interrupted so as to form the abutments 56 and 57 which have surfaces 100 and 101 which are at right angles to the thread and disposed between the uppermost thread and its adjacent thread and between the lowermost thread and its adjacent thread respectively so as to block the root area between these turns of the thread. The radial extension of these abutments 56 and 57 is less than the root diameter of the thread on the retaining member 53. The retaining member 53 is made by a metal stamping process which gives it a sheet metal nut thread 102 which consists of slightly less than a full 360° turn of thread with two end portions 103 and 104 which are substantially perpendicular to the threads. By rotation of the snap-on cap 49 the retaining member 53 will reach the limit of its range on the thread of the tubular member 26 as illustrated in FIGURES 4 and 5. When this occurs the thread end portion 103 of the thread 102 will rest against the abutment surface 100. Since these surfaces are apparently substantially parallel to each other the abutment surface 100 will prevent the retaining member 53 from moving off the tubular member 26. When the snap-on cap 49 is rotated clockwise, the retaining member 53 will move away from the abutment surface 100 due to the drag on the retaining member which is transmitted from the cover member 22 via the diaphragm 18, the rigid plate 19 and the spring 54 to the retaining member 53. As can be readily seen there is no means for a friction connection or binding to be established between the abutment 56 formed on the thread 52 of the tubular member 26 and the thread 102 of the retaining member 53.

It has long been the practice in the art to bend over a turn of a thread on a shaft so that a member which is threaded on that thread cannot pass beyond the deformed turn of the thread. However, when a thread is bent over in this method, it provides a wedge between two turns of the thread into which the end of the thread of the other member will normally wedge itself when it is turned into it. In addition, the threads of an internally threaded member, which is accommodated on such a threaded shaft, are designed so that the thread starts at the root diameter and spirals radially inward until reaching its established thread diameter. When this is done, the internally threaded member may wedge itself radially around an abutment or deformity produced by bending or hammering one turn of a thread into or towards the next turn of a thread. If such structure was utilized in the present invention, the cap 49 could be turned until the retaining member 53 contacted a deformed turn of the thread 52 and was wedged to it either by "between-the-turns" wedging, radial wedging or both. Then if the cap were turned in the opposite direction, the retaining member 53, being so wedged to the tubular member 26, would turn with the tubular member overcoming the frictional drag between the spring 54 and the rigid plate 19. The present invention provides an interruption which blocks the movement of an internal threaded member at a certain limit on an externally threaded shaft and does not have the disadvantage of creating a frictional or wedging connection between the two members that is normally produced when conventional threads are used on the internal threaded member and the external thread of the shaft type member is arbitrarily interrupted.

It will be understood by those skilled in the art that variation of the abutments 56 and 57 in their perpendicular form relative to the threads may be made as long as the wedging action is not created. Similarly, the perpendicular ends of the thread 102 may be altered within the scope of the present invention as long as the wedging effect is not created. A wedging effect is created by either a radially inwardly facing wedge shape as the end of the internal thread 102 or a radially outwardly facing wedge shape as the abutment between successive turns of the external thread 52. Therefore the scope of the invention is intended to include any cooperating combination of an abutment between turns of an external thread and an internal thread end which are void of respective radially outwardly facing or radially inwardly facing wedge shapes.

As aforementioned, the functions of the abutments are to rotationally lock the spring retaining member 53 to the tubular member 26 at each extremity of the range of actual motion of the spring retaining member 53. Thus as the stud is rotated so as to drive the retaining member 53 to a position in which it will engage the abutment 57, further rotational movement of the stud will cause the spring retaining member to rotate with the tubular member. This rotation of the retaining member 53 will cause the lower coil of the spring to slide upon the plate 19 and, while rotation of the stud may continue, this further rotation will not alter the position of the retaining member 53, and consequently will not change the biasing force of the spring 54. When the stud is rotated so that the abutment 56 is engaged by the retaining member as shown in FIGURES 4 and 5 the same action will occur. Thus it may be seen that placement of the abutments 56 and 57 defines a range of adjustment of the bias of spring 54. Any rotation of the stud beyond either end of the range of adjustment defined by the abutments will have no effect on the biasing force of the spring.

In operation, any increase in outlet pressure of the valve will be reflected in an increase in pressure in the chamber 24. The valve member 14 will thereupon be moved by the diaphragm 18 to maintain a constant pressure drop across the aperture 13, the magnitude of the pressure drop being determined by the control point setting of the spring 54.

As the valve member 14 moves toward or away from the aperture 13, air must be exhaled or inhaled respectively from the chamber 23. As air is exhaled from the chamber, the ball 32 is initially driven against the surface 47 with the rate of initial passage of air being determined by the size of the notch 48. When air is inhaled into the chamber, the ball will be seated against the surface 31 in the tubular member 26 with the rate of inhalation being determined by the size of the notch 33. It may thus be seen that the ball and its cooperating seating surfaces 47 and 31 determine the rate of inhalation and exhalation of air into the chamber 23 and hence the rate of motion of the valve member 13.

The control point of the regulating valve may be varied by removing the cap 49 and adjustably rotating the stud and the parts attached thereto. The engagement of the retaining member 53 with the thread notches 56 and 57 prevents tampering with the spring 54 and prevents adjustment of the spring beyond safe limits. The over-firing of a gas burner appliance by inexperienced personnel is thus prevented. As previously pointed out, the cooperation of the shoulders 37 and 38 in the tubular member 26 and the stud 34, automatically provides compression of the O-ring 44 to seal the entry of the stud into the cover and to provide the desired frictional force resisting rotation of the stud. The arrangement of the components of the adjusting device also permits the convenient integration therein of a means for controlling the entry and exit of air from the chamber above the diaphragm.

I claim:

1. In a spring-urged diaphragm fluid pressure regulator spring adjustment means comprising: a rotatable externally threaded member, a spring retaining member accommodated on said threads by an internal thread on said retaining member which terminates at each of its ends in an edge which is substantially perpendicular to said threads, said retaining member adapted to have a compression spring extending therefrom whereby rotation of said externally threaded member adjustably positions said retaining member axially on said threaded member and an upper and a lower thread on said retaining member being interrupted to form abutments between successive turns of the external thread which are substantially perpendicular to said threads and engageable by the respective ends of the internal thread on the retaining member whereby said retaining member is rotated with said externally threaded member at the extremities of its travel to limit the range of adjustment of the retaining member.

2. The combination of an externally threaded member, a nut accommodated on said threads by an internal thread on said nut which terminates at each of its ends in an edge which is substantially perpendicular to said threads whereby rotation of said externally threaded member adjustably positions said nut axially on said threaded member and a portion of said thread on said externally threaded member being interrupted to form an abutment between successive turns of the external thread which is substantially perpendicular to said threads and engageable by one of the ends of the internal thread on said retaining member whereby said nut cannot pass said abutment.

3. In a spring urged diaphragm fluid pressure regulator, spring adjusting means comprising: a rotatable externally threaded member having a thread root; a spring retaining member accommodated on said threads by an internal thread which terminates at each of its ends in an edge which is void of any radially inwardly facing wedge shape, said retaining member adapted to have a compression spring extending therefrom whereby rotation of said externally threaded member adjustably positions said retaining member axially on said threaded member; and an upper and a lower thread turn on said threaded member being interrupted to form abutments between successive turns of the external thread extending outwardly of the external thread root from a side of said external thread, said abutments being substantially perpendicular to said threads and engageable with the respective edge whereby said retaining member is rotated with the externally threaded member at the extremities of its travel to limit the range of adjustment of the retaining member.

4. The combination of a rotatable externally threaded member having a thread root; a spring retaining member accommodated on said thread by an internal thread which terminates at one of its ends in an edge which is void of any radially inwardly facing wedge shape, said retaining member adapted to have a compression spring extending therefrom whereby rotation of said externally threaded member adjustably positions said retaining member axially on said threaded member; and a portion of the thread on said externally threaded member being interrupted to form an abutment between successive turns of the external thread extending from a side of the external thread outwardly of the external thread root, said abutment being substantially perpendicular to the thread and engageable with said edge whereby said retaining member is prevented at an extremity of its travel from passing said interruption when said one internal thread end engages said abutment.

5. The combination of an externally threaded shaft having a thread root; a sheet metal stamped nut member adapted to be threaded on said threaded shaft by an internal thread which terminates at one end in an edge which is void of any radially inwardly facing wedge shape; and an abutment between two successive turns of the external thread on said shaft extending from a side of said shaft thread outwardly of the external thread root, said abutment having a surface which is substantially perpendicular to the direction of travel of said internal thread on said external thread at said abutment as the nut member is rotated relative to said shaft and engageable with said edge whereby a friction connection between said abutment and said nut is avoided when said one end of the internal thread comes into contact with said abutment.

6. The combination of a rotatable externally threaded member having a thread root; a spring retaining member accommodated on said thread by an internal thread which terminates at one of its ends in an edge substantially perpendicular to the internal thread, said retaining member adapted to have a compression spring extending therefrom whereby rotation of said externally threaded member adjustably positions said retaining member axially on said threaded member; and a portion of the thread on said externally threaded member being interrupted to form an abutment between successive turns of the external thread extending from a side of the external thread outwardly of the external thread root, said abutment being void of any radially outwardly facing wedge shape and engageable with said edge whereby said retaining member is prevented at an extremity of its travels from passing said interruption when said one internal thread end engages said abutment.

7. The combination of an externally threaded shaft having a thread root; a sheet metal stamped nut member adapted to be threaded on said threaded shaft by an internal thread which terminates at one end in an edge substantially perpendicular to the internal thread; and an abutment between two successive turns of the external thread on said shaft extending from a side of said shaft thread outwardly of the external thread root, said abutment being void of any radially outwardly facing wedge shape and engageable with said edge whereby a friction connection between said abutment and said nut is avoided when said one end of the internal thread comes into contact with said abutment.

8. The combination of an externally threaded shaft having a thread root; a nut member adapted to be freely threaded on said threaded shaft for axial movement relative to said threaded shaft by an internal thread which terminates at one end in an edge which is void of any radially inwardly facing wedge shape; and an abutment between two successive turns of the external thread on said shaft extending from a side of said shaft thread outwardly of the external thread root, said abutment having a surface which is substantially perpendicular to the direction of travel of said internal thread on said external thread at said abutment as the nut member is rotated relative to said shaft and engageable with said edge whereby a friction connection between said abutment and said nut is avoided when said one end of the internal thread comes into contact with said abutment.

9. The combination of an externally threaded shaft having a thread root; a nut member adapted to be freely threaded on said threaded shaft for axial movement relative to the shaft by an internal thread which terminates at one end in an edge substantially perpendicular to the internal thread; and an abutment between two successive turns of the external thread on said shaft extending from a side of said shaft thread outwardly of the external thread root, said abutment being void of any radially outwardly facing wedge shape and engageable with said edge whereby a friction connection between said abutment and said nut is avoided when said one end of the internal thread comes into contact with said abutment.

References Cited in the file of this patent
UNITED STATES PATENTS

| | | |
|---|---|---|
| 729,207 | Mulligan | May 26, 1903 |
| 1,020,668 | Thomson | Mar. 19, 1912 |
| 1,023,490 | Beck et al. | Apr. 16, 1912 |
| 1,329,427 | Otto | Feb. 3, 1920 |
| 2,342,170 | Tinnerman | Feb. 22, 1944 |
| 2,706,525 | Ruppert | Apr. 19, 1955 |
| 3,062,525 | Schutmaat | Nov. 6, 1962 |